(No Model.)

H. BERGFELS.
SPRING FOR BICYCLE SADDLES.

No. 480,838. Patented Aug. 16, 1892.

Attest:
L. Lee.
Edw. F. Kinsey.

Inventor
Henry Bergfels, per
Crane & Miller, Attys.

THE NORRIS PETERS CO., PHOTO-LITHO., WASHINGTON, D. C.

UNITED STATES PATENT OFFICE.

HENRY BERGFELS, OF NEWARK, NEW JERSEY.

SPRING FOR BICYCLE-SADDLES.

SPECIFICATION forming part of Letters Patent No. 480,838, dated August 16, 1892.

Application filed April 28, 1892. Serial No. 431,075. (No model.)

*To all whom it may concern:*

Be it known that I, HENRY BERGFELS, a citizen of the United States, residing at Newark, Essex county, New Jersey, have invented certain new and useful Improvements in Compound Springs for Bicycle-Seats, fully described and represented in the following specification and the accompanying drawings, forming a part of the same.

This invention consists in a particular construction for making a highly-elastic seat-spring from two leaves of flat spring-steel. In this construction one of the leaves is made of thicker metal than the other, and the middle of the thicker leaf is connected with the end of the thinner leaf, and the projecting end of the thicker leaf is reduced in thickness and reflexed to make it yield transversely.

The construction and operation of my spring will be understood by reference to the annexed drawings, in which—

Figure 1:
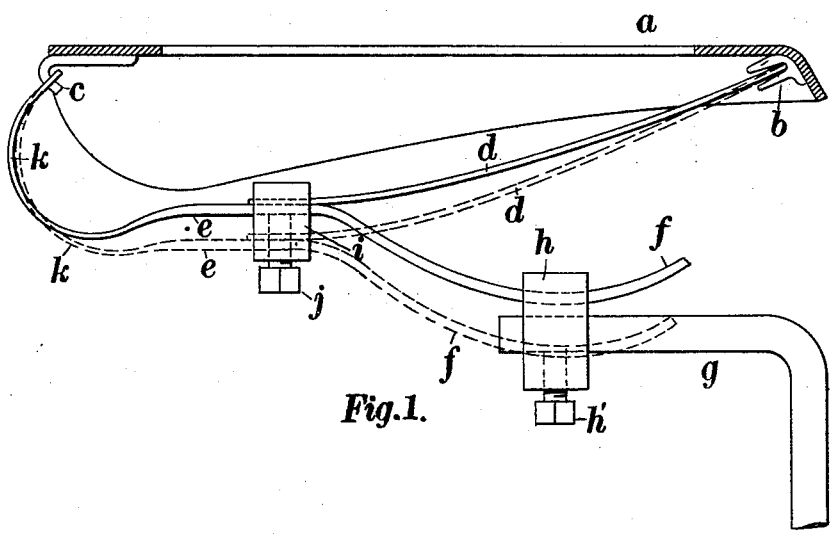
Figure 2:
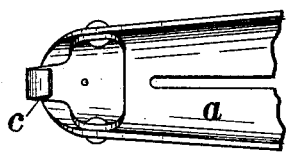
Figure 3:
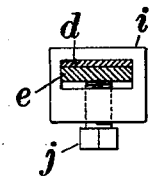

Figure 1 is a side elevation of a saddle-spring with the seat-leather shown in section. Fig. 2 is a view upon the under side of the forward end of the seat, showing the hook attached to the leather for engaging the reflexed spring; and Fig. 3 is an end view of the clamp for uniting the leaves with a section of the leaves secured within the same.

$a$ is the seat, provided at opposite ends with a cantle $b$ and hook $c$ to receive the free ends of the spring. The spring is formed with a leaf $d$, which is curved downward from the cantle and extended forward about two-thirds the length of the seat, and the leaf $e$, secured adjustably to the end of the leaf $d$ by clamp $i$ and set-screw $j$. The leaf $e$ projects backward and forward from the clamp, its rear end being extended downward in a curve to form a supporting spring-arm $f$, which may be sustained upon the bicycle-frame by any suitable means, as by the strap $h$, secured to the support $g$ by set-screw $h'$, as shown in Fig. 1. The forward end of the leaf $e$ is bent into a reflex curve with its free end perforated to engage the hook $c$. The leaf $e$ is made materially thicker than the leaf $d$, for the purpose hereinafter described, and its forward end is reduced in thickness throughout the reflex part $k$ to furnish a greater degree of elasticity in such portion than in the body and spring-arm $f$. By making the body of the leaf $e$ and its rear extension $f$ thicker than the spring $d$ and by the reduction of the reflex portion $k$ the strain upon the seat causes the leaf $d$ and such reflex portion to bend much more than the leaf $e$, and thus develops the elasticity of the reflex portion, which stands transversely to the seat $a$, so as to yield much more freely than if it were extended from the clamp $i$ directly to the forward end of the seat in a manner similar to the spring $d$. The leather of the seat is thus protected from undue strains and the separate leaves are caused to yield in the desired degree when in use. The whole construction thus forms a very easy riding-saddle.

The full lines in Fig. 1 indicate the position of the leaves and their relation to the support $g$ when the saddle is loaded.

The dotted lines $d\ e\ f\ k$ show the normal shape of the leaves in relation to the leather when the load is removed from the saddle, the seat $a$ not being elevated to express the removal of the load, as the drawings would be confused by such a method of representing the change in the shape of the leaves. The pressure of the load, as will be seen by the full lines in Fig. 1, tends to flatten the leaf $d$ and to press the end of the auxiliary spring outward against the hook $c$, while increasing its curvature.

Heretofore it has been common to form an entire seat-spring of a single leaf of uniform thickness throughout and to form a reflex bend upon the forward end of such leaf, and also to attach an auxiliary spring formed of coiled wire to the front end of a flat leaf-spring; but these constructions operate differently from mine, as the use of two leaves and the superior thickness of the leaf $e$ in my construction give a firm support to the seat, while the proportions of the parts $d$ and $k$ give the elasticity desired.

I am also aware that a bow-shaped spring has been formed of two members adjustably clamped together with the front member extended backwardly from the clamp; but where the spring is formed of bow shape and its front and rear ends are attached directly to a seat-leather there is no element in the structure which is adapted to yield parallel to the leather, and the load therefore imposes a great tension upon the seat. My present construction wholly avoids the use of a bow-shaped spring and secures the desired flexibility in the spring without additional pieces by reducing the thickness of the leaf $e$ at its forward end and bending it into the reflex curve $k$. My construction thus performs entirely different functions without increasing the number of parts.

The adjustability of the clamp $i$, by which the two springs are secured together, furnishes a means of properly adjusting the tension at the outset, and, as in similar constructions, of restoring the same when the seat $a$ is stretched by continued use.

Having thus set forth my invention, what I claim as new is—

The combination, with the bicycle-seat $a$, of the spring formed of the flat leaves $d$ and $e$, clamped together adjustably, as set forth, the leaf $e$ being extended downward and backward from the clamp and terminated in a spring-arm $f$, and the forward end of the leaf $e$ being reduced in thickness and bent into the reflex curve $k$ and engaged with the forward end of the seat, as set forth.

In testimony whereof I have hereunto set my hand in the presence of two subscribing witnesses.

HENRY BERGFELS.

Witnesses:
W. H. BERGFELS,
THOMAS S. CRANE.